US012609055B2

(12) United States Patent
Murray

(10) Patent No.: US 12,609,055 B2
(45) Date of Patent: *Apr. 21, 2026

(54) NONDESTRUCTIVE WINDOW MOUNTABLE SILICONE EDGE GRAPHIC

(71) Applicant: Super Color Digital, LLC, Irvine, CA (US)

(72) Inventor: Scott V. Murray, Mission Viejo, CA (US)

(73) Assignee: Super Color Digital, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,808

(22) Filed: Sep. 17, 2024

(65) Prior Publication Data

US 2025/0014484 A1 Jan. 9, 2025

Related U.S. Application Data

(63) Continuation of application No. 17/459,912, filed on Aug. 27, 2021, now Pat. No. 12,118,905.

(51) Int. Cl.
*G09F 7/18* (2006.01)
*F16B 47/00* (2006.01)
(52) U.S. Cl.
CPC .............. *G09F 7/18* (2013.01); *F16B 47/00* (2013.01); *G09F 2007/1852* (2013.01)
(58) Field of Classification Search
None
See application file for complete search history.

(56) References Cited

U.S. PATENT DOCUMENTS

| | | | | |
|---|---|---|---|---|
| 914,775 | A | * 3/1909 | Aarons | G09F 17/00 |
| | | | | 248/206.4 |
| 1,232,120 | A | * 7/1917 | Sutter, Jr. | G09F 11/23 |
| | | | | 248/205.5 |
| 1,739,801 | A | * 12/1929 | Pitts | A47F 7/147 |
| | | | | 248/206.3 |
| 2,143,608 | A | * 1/1939 | Morris | B60S 1/023 |
| | | | | 40/780 |
| 2,314,803 | A | * 3/1943 | Wagner | G09F 7/12 |
| | | | | 156/92 |
| 5,099,594 | A | 3/1992 | Reas | |
| 5,241,768 | A | 9/1993 | Thompson | |
| 5,423,140 | A | 6/1995 | Nuspl | |
| 6,446,375 | B1 | 9/2002 | Davis | |
| 2013/0062483 | A1 | 3/2013 | Moussaieff | |
| 2014/0338239 | A1 | 11/2014 | Scheiman | |
| 2019/0077338 | A1 | 3/2019 | Urbanczyk, II | |
| 2021/0027664 | A1 | 1/2021 | Hatton | |

* cited by examiner

*Primary Examiner* — Steven M Marsh
(74) *Attorney, Agent, or Firm* — DANE IP Law PC

(57) ABSTRACT

A silicone edge graphic mountable to a window with suction cups is shown. The silicone edge graphic may have a frame where the suction cups are attached to the frame and offset from the frame so that the frame is not touching a mounting surface of the window or the wall of the window when mounted to mitigate damage to the window or wall. When the silicone edge graphic is mounted to the window, the frame may rest on a support surface, such as a window sill or the ground, to provide additional support for the weight of the silicone edge graphic.

14 Claims, 13 Drawing Sheets

NONDESTRUCTIVE WINDOW MOUNTABLE SILICONE EDGE GRAPHIC

CROSS-REFERENCE TO RELATED APPLICATIONS

This application is a continuation application of U.S. patent application Ser. No. 17/459,912, filed on 2021 Aug. 27, the content of which is expressly incorporated by reference herein.

STATEMENT RE: FEDERALLY SPONSORED RESEARCH/DEVELOPMENT

Not applicable.

BACKGROUND

The various aspects and embodiments described herein relate to a silicone edge graphic, which can be mounted to a surface while mitigating damage to the surface and without use of mechanical destructive attachment devices (e.g., screws, nails) or adhesives.

Individuals and companies rent space in convention centers and hotel meeting areas for various purposes. By way of example and not limitation, individuals and companies may hold a presentation, exhibition, trade show, or some other type of promotional event at convention centers or hotels. In doing so, individuals and companies would like to personalize their space in order to maximize advertisements, messaging and other information to be conveyed to the attendees of the meeting. Unfortunately, convention centers and hotels generally do not allow companies to mount graphics on windows and walls because of the damage mounting the graphic to the window or wall does to the window or wall. In instances where mounting on windows is allowed, mounting requires a cumbersome and precision demanding professional installation and removal to minimize damage.

Accordingly, there is a need in the art for an improved method and device to provide visual materials on windows for visitors of convention centers and hotels.

BRIEF SUMMARY

A silicone edge graphic (SEG) which is mountable to a window without damaging the window or the surrounding wall is disclosed. Although the various aspects of the device and method is described in relation to an SEG, other types of frames and graphical structures are also contemplated. The SEG may have suction cups which are removably attachable to glass of the window. Preferably, only the suction cups touch the glass or the window to mitigate or eliminate damage to the window or wall in which the window is formed.

More particularly, a silicone edge graphic mountable to a window for mitigating damage to a mounting surface of the window is disclosed. The silicone edge graphic may comprise a frame defining front and rear surfaces; a suction cup attached to the frame, the suction cup defining an engagement surface that generates a vacuum against the mounting surface of the window to mount the silicone edge graphic to the window, the engagement surface of the suction cup being offset away from the rear surface of the frame so that the front surface of the frame is further away from the engagement surface than the rear surface of the frame to prevent contact between the frame and the mounting surface when the silicone edge graphic is mounted to the window; and a sheet with indicia printed thereon, an outer peripheral portion of the sheet having a shape coinciding with an outer periphery of the frame, an edge portion of the sheet having silicone attached thereto, the silicone being disposed within slots formed in the frame to attach the sheet to the frame.

A bottom portion of the frame may contact a support surface to prevent vertical movement of the silicone edge graphic when mounted and prevent rubbing of the suction cup against the mounting surface of the window.

The support surface may be a sill of the window or a ground disposed in front of the window.

The silicone edge graphic may further include a cushion attached to a bottom portion of the frame to prevent damage to the support surface.

The engagement surface may be offset about ½ inch from the rear surface.

The silicone edge graphic may have a larger surface area than a surface area of the window and the silicone edge graphic is not in direct contact with the window or a wall of the window.

The silicone edge graphic may have a smaller surface area than a surface area of the window and a bottom portion of the frame may rest on a sill of the window.

In another aspect, a wall with a window and a silicone edge graphic attached to the window while mitigating damage to the window is disclosed. The wall may comprise a frame defining front and rear surfaces; a suction cup attached to the frame, the suction cup defining an engagement surface that generates a vacuum against the mounting surface of the window to mount the silicone edge graphic to the mounting surface, the engagement surface of the suction cup being offset away from the rear surface of the frame so that the front surface of the frame is further away from the engagement surface than the rear surface of the frame to prevent damage to the mounting surface when the silicone edge graphic is mounted to the window; and a sheet with indicia printed thereon, an outer peripheral portion of the sheet having a shape coinciding with an outer periphery of the frame, an edge portion of the sheet having silicone attached thereto, the silicone being disposed within slots formed in the frame to attach the sheet to the frame.

The frame may have a larger surface area than a surface area of the window and the frame may not be in direct contact with the window or a wall of the window. Alternatively, the frame may have a smaller surface area than a surface area of the window and a bottom portion of the frame may rest on a sill of the window.

In another aspect, a method of mounting a silicone edge graphic to a window is disclosed. The method may comprise the steps of providing a frame having a suction cup, the frame being attachable to the window; resting the frame on a support surface; contacting the suction cup directly with a mounting surface of the window so that an engagement surface defined by the suction cup generates a vacuum against the mounting surface of the window and the engagement surface of the suction cup is offset away from a rear surface of the frame so that a front surface of the frame is further away from the engagement surface than the rear surface of the frame to prevent contact between the frame and the mounting surface of the window; providing a sheet with indicia printed thereon, an outer peripheral portion of the sheet having a shape coinciding with an outer periphery of the frame, an edge portion of the sheet having silicone attached thereto; and inserting the silicone edge portion of the sheet within a slot contouring outer edges of the frame.

In the method, the support surface may be a sill of the window or a ground disposed in front of the window.

The method may further comprise the steps of providing the frame of the silicone edge graphic having an outer circumference smaller than an inner circumference of a frame of the window; and disposing the frame of the silicone edge graphic within the frame of the window. Alternatively, the method may also further comprise the steps of providing the frame of the silicone edge graphic having an outer circumference larger than an inner circumference of a frame of the window; and disposing the frame of the silicone edge graphic in front of the wall of the window.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
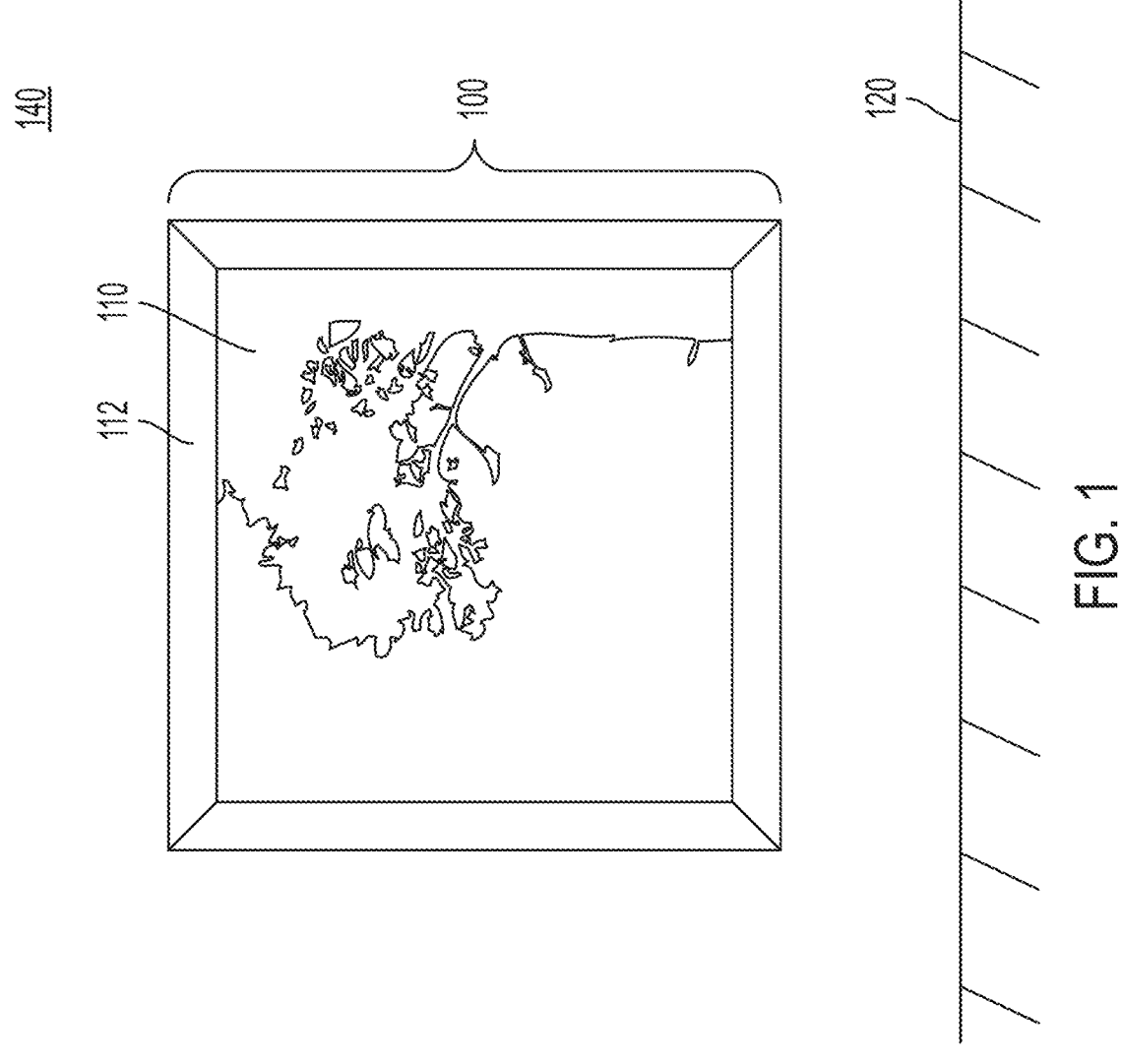
FIG. 1 is a front view of a window in a wall.

Referring now to the drawings, a silicone edge graphic 130 (SEG) mountable to a window 100 with suction cups 136 is shown. The suction cups 136 secure the SEG 130 to the window and mitigates damage to the window or wall. For example, the SEG 130 may have a frame 134. The suction cups 136 are attached to the frame so that the suction cups 136 in an offset position from the frame 134. Because of the offset, when the suction cups 136 are in contact with the glass 116 of the window, the frame 134 does not touch a mounting surface 110 of the glass 116 of the window 100. The suction cup also uses vacuum pressure to attach the SEG 130 to the window 100 and does not damage the window. Moreover, in certain situations, any up and down movement of the SEG 130 is minimized or eliminated because the SEG 130 can be supported by the window sill 114 or the ground 120 in front of the window 100. By minimizing or eliminating vertical movement, any damage to the window 100 that might be caused by rubbing of the suction cups to the glass 116 of the window is mitigated or eliminated. The SEG 130 may be sized and configured to fit within a window frame 112 so that the window is not noticed. Alternatively, the SEG 130 may be sized and configured to fit in front of and cover the entire window so that those that pass by the SEG 130 cannot tell that a window is behind the SEG 130.

Referring now to FIG. 1, a window 100 is shown. The window 100 may be disposed in a wall 140 that extends from the ground 120. The window 100 may have a flat mounting surface 110 for a SEG 130 (see FIG. 2) to be mounted on. The mounting surface 110 may be an interior surface of a glass of the window. The mounting surface 110 may be a nonporous and transparent or translucent material. Other examples of materials suitable for use as the mounting surface 110 other than glass include acrylic sheeting or polycarbonate shecting. The mounting surface 110 may be coated with a protective film or multiple layers of protective film for insulation or sun protection. A window frame 112 may surround the mounting surface 110.

Figure 2:
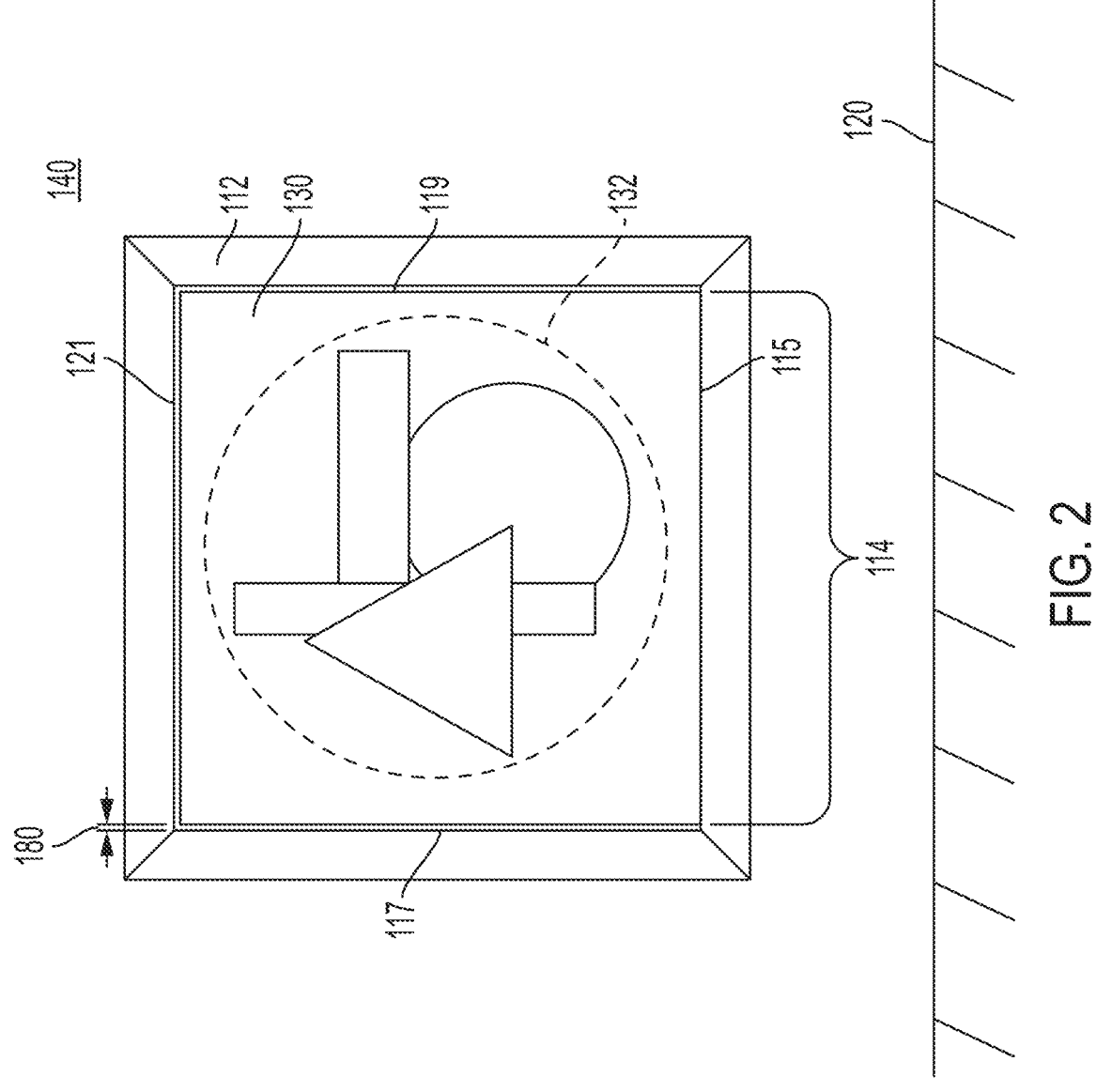
FIG. 2 is a front view of a silicone edge graphic mountable on the window shown in FIG. 1.
Figure 3:
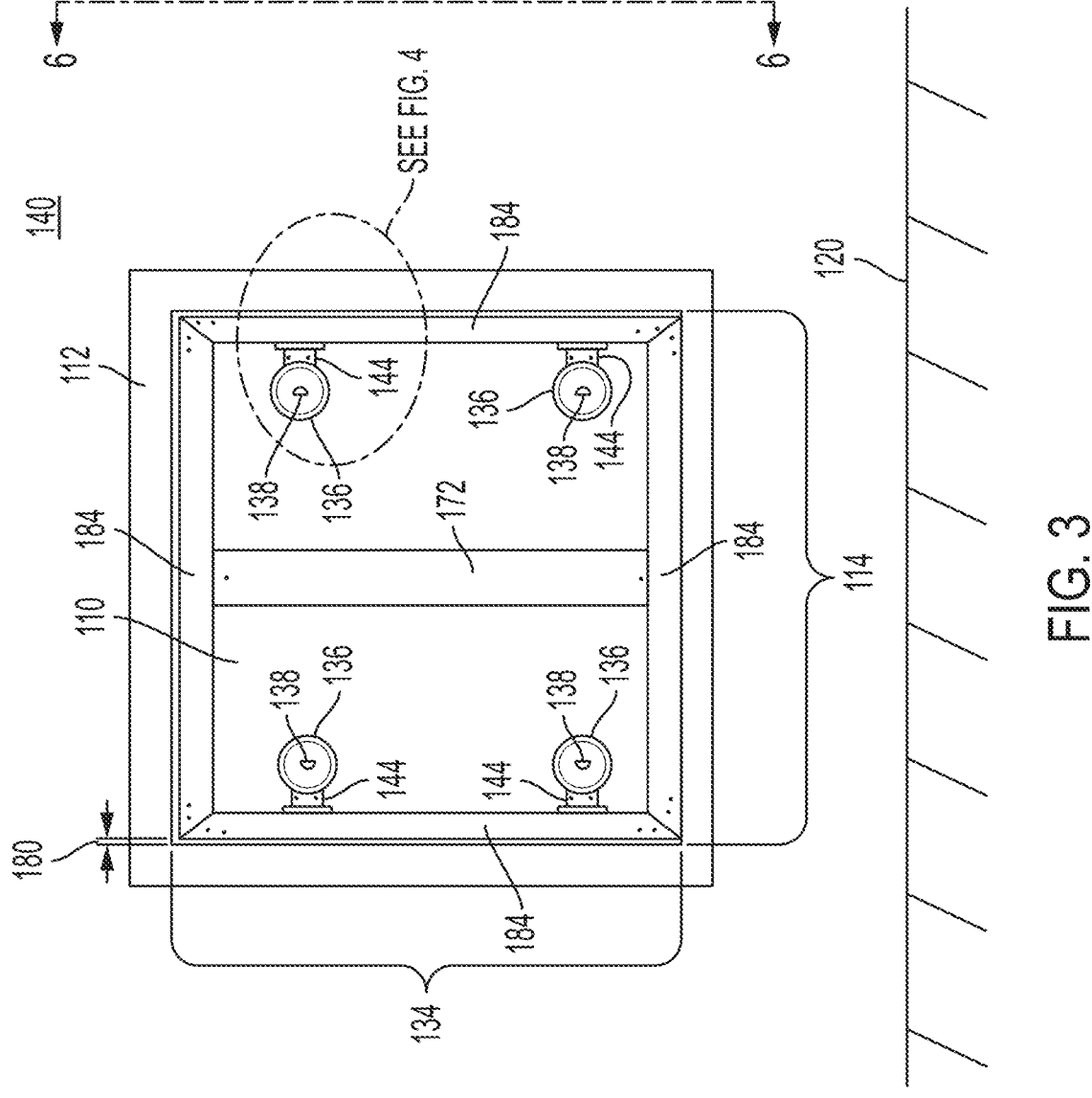
FIG. 3 is a front view of a frame and suction cups of the silicone edge graphic shown in FIG. 2.

Referring now to FIG. 2, a SEG 130 may be mounted on the mounting surface 110 (see FIG. 1) of the window 100 (see FIG. 1) via a suction cup 136 (see FIG. 3). The SEG 130 may display indicia 132 for viewing. The SEG 130 may rest on a sill 114 of the window 100 to mitigate or eliminate vertical movement of the SEG 130 and rubbing of the suction cups 136 on the mounting surface 110. The sill may support the weight of the SEG 130 so that the entire weight of the SEG 130 is not only supported by the suction cups 136. The weight of the SEG 130 is supported by the suction cups 136 and the sill. If the suction cups 130 were to fail, the SEG 130 may be supported by the sill so that the SEG 130 does not fall down. The SEG 130 may have top, left, right, and bottom edges 121, 117, 119, and 115 respectively. The edges 117, 119, 121 of the SEG 130 do not rest on the window sill 114 and may have a snug fitment inside of the window frame 112. By snug fitment, a space 180 between 0.1 inch to 2 inches between the edges 121, 117, 119 of the SEG 130 and the window frame 112 may exist. Preferably, the space 180 is between 0.1 to 1 inch. Most preferably, the space 180 is between 0.1 to 0.5 inches. In this way, people looking at the SEG 130 may not notice that the SEG 130 is actually covering the window.

Referring now to FIG. 3, the frame 134 of the SEG 130 (see FIG. 2) is shown without the sheet 170 to show how the SEG 130 is attached to the mounting surface 11110. The SEG frame 134 may sit on the window sill 114 in a vertical position to mitigate or eliminate vertical movement of the SEG 130 and rubbing of the suction cups 136 on the mounting surface 110. The suction cups 136 are pushed against the mounting surface 110 to form a vacuum which holds the suction cups 136 and the frame 134 to the mounting surface. The suction cups 136 may be a two stage suction cups 136. The second stage may be activated by pulling down a handle to ensure that suction is maintained and not lost.

Figure 4:
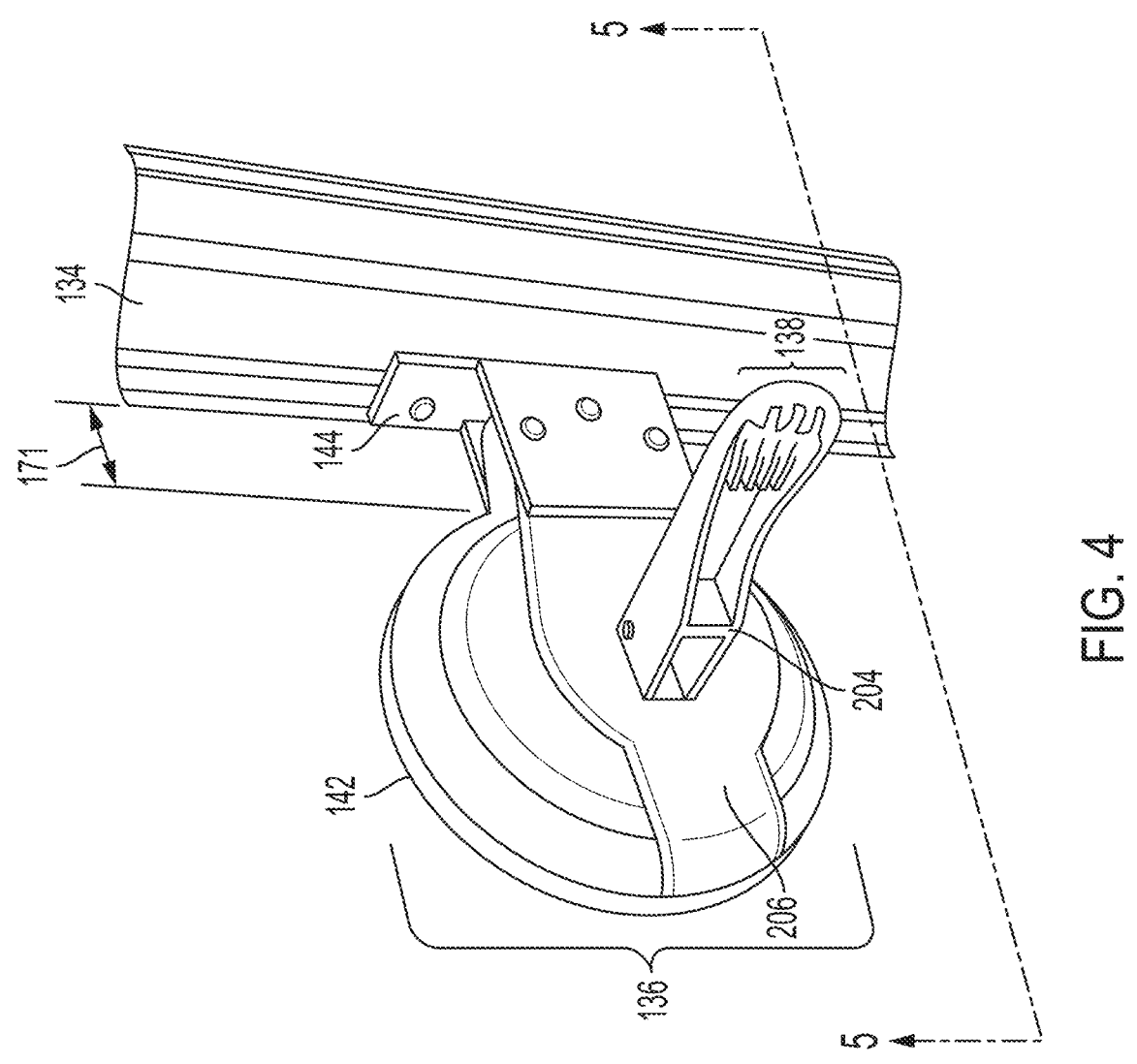
FIG. 4 is an enlarged, cut-away perspective view of a portion of the silicone edge graphic shown in FIG. 3.

In FIG. 3, a plurality of suction cups 136 attached to the frame 134 via attachment members 144 is shown. FIG. 4 illustrates one suction cup 136 attached to the frame 134. The attachment members 144 may be brackets. The attachment members 144 may be fixed to the frame 134 with threaded or non-threaded fasteners used in the field, such as screws, bolts, and nails. The frame 134 may be metal, plastic, or wooden construction. Aluminum may be preferable for its light weight and material strength. The frame 134 may comprise segments 184 (see FIG. 3) that are fastened together with threaded or non-threaded fasteners used in the field, such as screws, bolts, and nails. The frame 134 may have a central frame member 172 to provide additional structural integrity to the frame 134 and prevent the SEG 130 from twisting. Only one central frame member 172 is shown in FIG. 3; however, multiple central frame members 172 may be utilized depending on the size of the SEG 130 and the structural stability sought.

The SEG 130 may have one suction cup 136 or a plurality of suction cups 136 (see FIG. 3). The suction cups 136 may be mounted by pushing each suction cup 136 toward the mounting surface 110 to create a vacuum in between each suction cup 136 and the mounting surface 110. Preferably, the suction cups 136 may have a 2-stage mounting process as well as a 2-stage removal process. The first stage may be contacting the suction cup 136 directly with the mounting surface 110 of the window 100 (see FIG. 1) so that an engagement surface 142 (see FIGS. 4 and 5) defined by the suction cup 136 generates a vacuum against the mounting surface 110 of the window 100. The second stage may be locking a lock 138 (shown in greater detail in FIG. 4) of the suction cup 136 to hold the form of the suction cup 136, thereby preserving the vacuum that keeps the suction cup 136 intact at the engagement surface 142. The lock 138 may be a handle. FIGS. 3 and 4 show a handle 138 in an unlocked position. To remove the suction cup 136, first, the lock 138 may be unlocked and, second, the suction cup 136 may be peeled off by applying a force directed away from the engagement surface 142. In other applications, the lock 138 feature may be eliminated based on need and preference; for instance, if the SEG 130 is lightweight so that the suction cups 136 can carry the load of the SEG 130 without the need for a lock 138. The suction cup 136 mounting and peeling methods may mitigate or eliminate any damage to the mounting surface 110.

Figure 5:
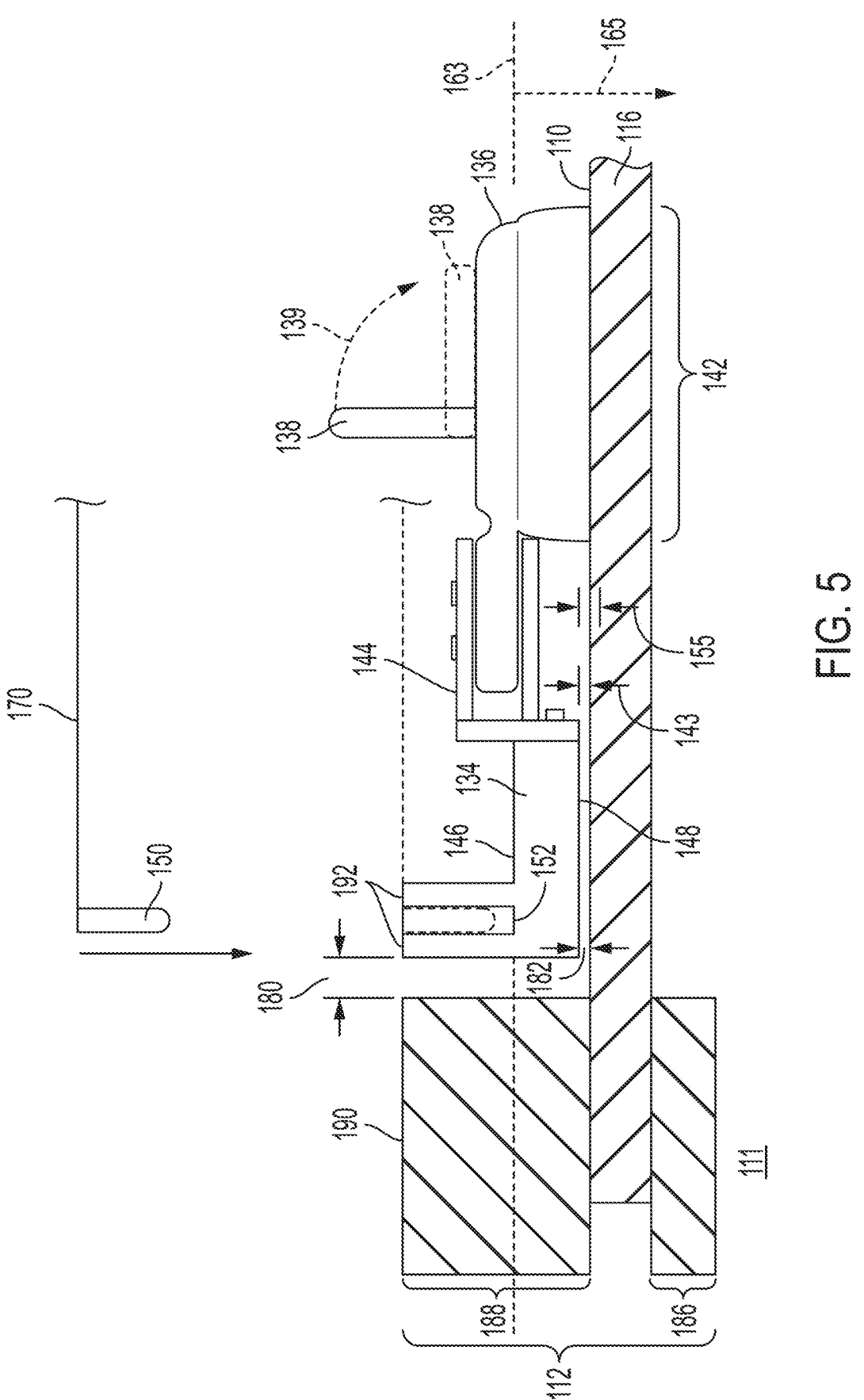
FIG. 5 is a cross-section view of the portion of the silicone edge graphic frame shown in FIG. 4 and a silicone edge graphic sheet insertable to the frame.

Referring now to FIG. 4, the suction cup 136 may be attached to the frame 134 with the attachment member 144. The attachment member 144 may be a bracket. In an unlocked position, the handle 138 of the suction cup 136 may have a rear surface 204 that is upward. The unlocked position is shown in FIG. 4. In a locked position (see FIG. 5), the handle 138 is in the down position. The trajectory 139 of the handle 138 when transitioning from the unlocked position to the locked position is shown in FIG. 5 with dashed lines. The attachment member 144 may be attached to one frame segment 184. The attachment member may be sized and configured to position an engagement surface 142 of the suction cup 136 so that a gap 155 (see FIG. 5) between the rear surface 148 of the frame 134 and the mounting surface 110 of the glass of the window 100 exist when the SEG frame 134 is initially laid on the sill and pushed against the mounting surface 110 of the window. Moreover, the attachment member 144 may be sized and configured to maintain a gap 143 when the SEG frame 134 is pushed against the mounting surface 110 of the window and after engagement of the second stage of the suction cups 136. Because there is always a space represented by either gaps 155 or 143, the SEG frame 134 does not touch and thus does not mar the window glass or the window. Plus, because suction cups 136 are utilized for mounting the SEG 130 to the mounting surface 110 and suction cups are easily removable without any chemical or mechanical fastening, potential for damage to the window or wall is mitigated or eliminated.

The attachment member may be attached to an interior side of the frame 184 to position the suction cup 136 inside of an outer periphery of the frame 184. When the sheet 170 is attached to the frame 134, the sheet hides the mechanical devices that are used to mount the SEG 130 to the window so that people sees the aesthetically beautiful sheet 170 and not the suction cups 136. The frame 134 may define a plane 163 and an axis 165 perpendicular to the plane 163. The gaps 155 and 143 are measured along axis 165. The engagement surface 142 may be positioned at different positions on axis 165 by making a length 169 of the plate 167 (see FIG. 8) longer or shorter. The length 169 being parallel to axis 165. The engagement surface 142 can also be positioned inward by extending a length 171 (see FIGS. 4 and 8) of the bracket 144.

Referring now to FIG. 5, the glass 116 is held by the window frame 112. An outer portion 186 of the window frame 112 may be an exterior 111 of a structure or a building. An inner portion 188 of the window frame 112 may be surrounded by the wall 140 (see FIG. 1). A SEG sheet 170 may comprise a material, such as vinyl or fabric, suitable for displaying indicia 132 (see FIG. 2) printed thereon without distorting the indicia 132 when the sheet 170 is extended out across the SEG frame 134. The sheet 170 may have silicone edges 150. The silicone edges 150 may be received by a slot 152 of the frame 134 to mount the sheet to the frame 134. Prior to inserting the silicone edges 150 of the sheet 170 into the slot 152, the handle 138 of the suction cup 136 may have to be pushed down so that the suction cup 136 enters the second stage. When the handle of the suction cup is pushed downward, clearance is provided for the sheet 170. The slot 152 may extend outward from a front surface 146 of the frame 134 and away from a rear surface 148 of the frame 134. The slot 152 may trace the outer periphery of the front surface 146 of the frame 134. When the suction cup 136 is positioned on the mounting surface 110 to engage an engagement surface 142 with the mounting surface 110, the rear surface 148 of the frame 134 may be offset from the engagement surface 142, creating a space 182. In this arrangement, the front surface 146 may be further away from the engagement surface 142 than the rear surface 148 of the frame. Also in this arrangement, the rear surface 148 of the frame 134 and the mounting surface 110 are not in direct contact with each other. The space 182 may prevent any damage by the frame 134 to the mounting surface 110. The space 182 may be between 0.5 inches to 2 inches. Preferably, the space 182 is between 0.5 inches to 1.5 inches. Most preferably, the space 182 is between 0.5 inches to 1 inch. Additionally, the window frame 112 and the frame slot 152 may each have a front surface 190 and 192 respectively, that are offset from each other as shown by example or coplanar with each other. Either the front surface of the window frame 190 or the front surface of the frame slot 192 may be further away from the mounting surface 110. The offsetting may be between 0.1 to 2 inches. Preferably, the offsetting is 0.1 to 1 inch. Most preferably, the offsetting is 0.1 to 0.5 inch.

Figure 6:
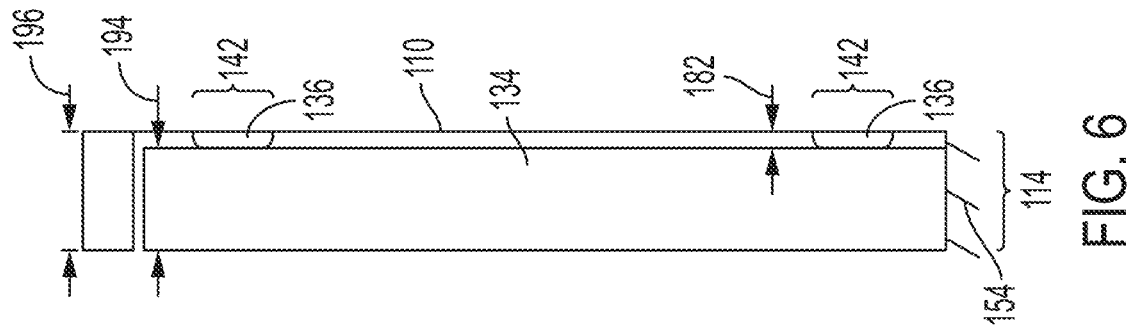
FIG. 6 is a side view of the silicone edge graphic shown in FIG. 2.

Referring now to FIG. 6, in a mountable position, the SEG frame 134 may be resting on the window sill 114 to mitigate or eliminate vertical movement of the SEG 130 and rubbing of the suction cups 136 on the mounting surface 110. In this position, a bottom surface 154 of the frame 134 may be in direct and flush contact with the window sill 114. Further, the frame 134 may have a depth 194 equal to, greater than, or less than a depth 196 of the window frame 112. The depth 196 of the window frame is from a front surface 190 (see FIG. 5) of the window frame 112 to the mounting surface 110. Preferably, the difference between depth 194 and 196 is sufficient so that a front surface of the sheet is flush with the front surface 190 fo the window frame. To this extent, the depth 196 may be smaller by approximately 0.1 to 12 inches. Most preferably, the difference may be between 0.1 to 0.5 inch.

Figure 7:
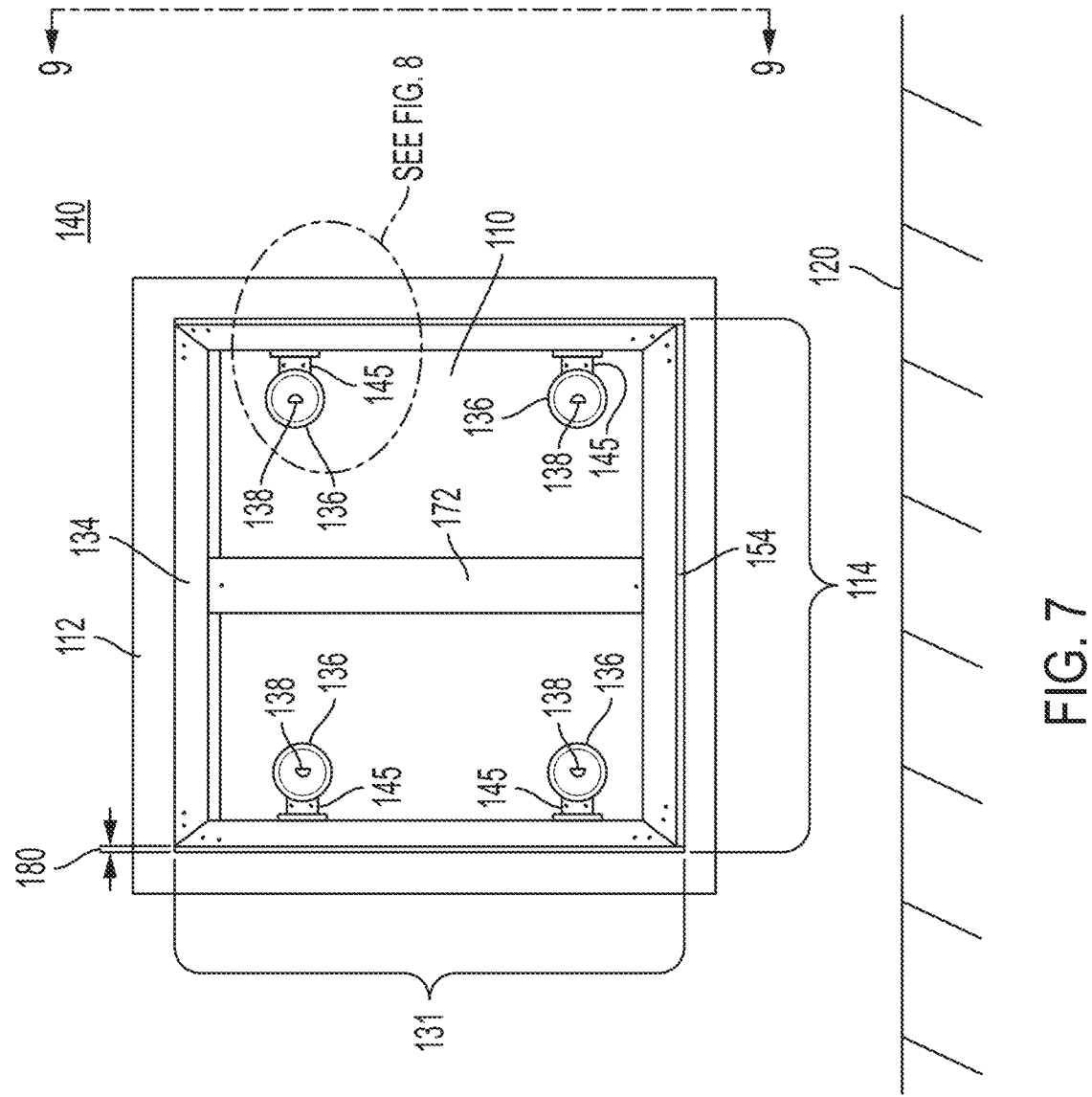
FIG. 7 is a front view of a frame and suction cups of a silicone edge graphic mountable on a window in a tilted position.

Referring now to FIG. 7, an embodiment of the SEG 131 that is configurable to tilt (see FIG. 9) toward the mounting surface 110 is presented. In FIG. 7, the sheet 170 is not shown to show the suction cups 136 and the attachment members 145. When the SEG 131 is tilting toward the mounting surface 110, if the suction cups 136 were to lose suction, then the SEG 131 would not fall away from the window but would remain leaned against the window glass. A rear edge 153 (see FIG. 9) of the bottom surface 154 of the frame 134 may be directly in contact and resting against the window sill 114 to mitigate or eliminate vertical movement of the SEG 131 and rubbing of the suction cups 136 on the mounting surface 110. As shown by example, a plurality of suction cups 136 may be each attached to the SEG frame 134 with a suction cup attachment member 145 (shown in greater detail in FIG. 8). When the SEG 131 is tilted and leaned against the window glass, the lengths 169 of the attachment members 145 associated with the upper suction cups 136 may be shorter than the lengths 169 of the attachment members 145 associated with the lower suction cups to create the angle 200 shown in FIG. 9. When the SEG 131 is mounted to the window, the frame of the SEG 131 does not contact the glass or the inner surface of the window frame 112 to mitigate or eliminate damage to the window and wall.

Figure 8:
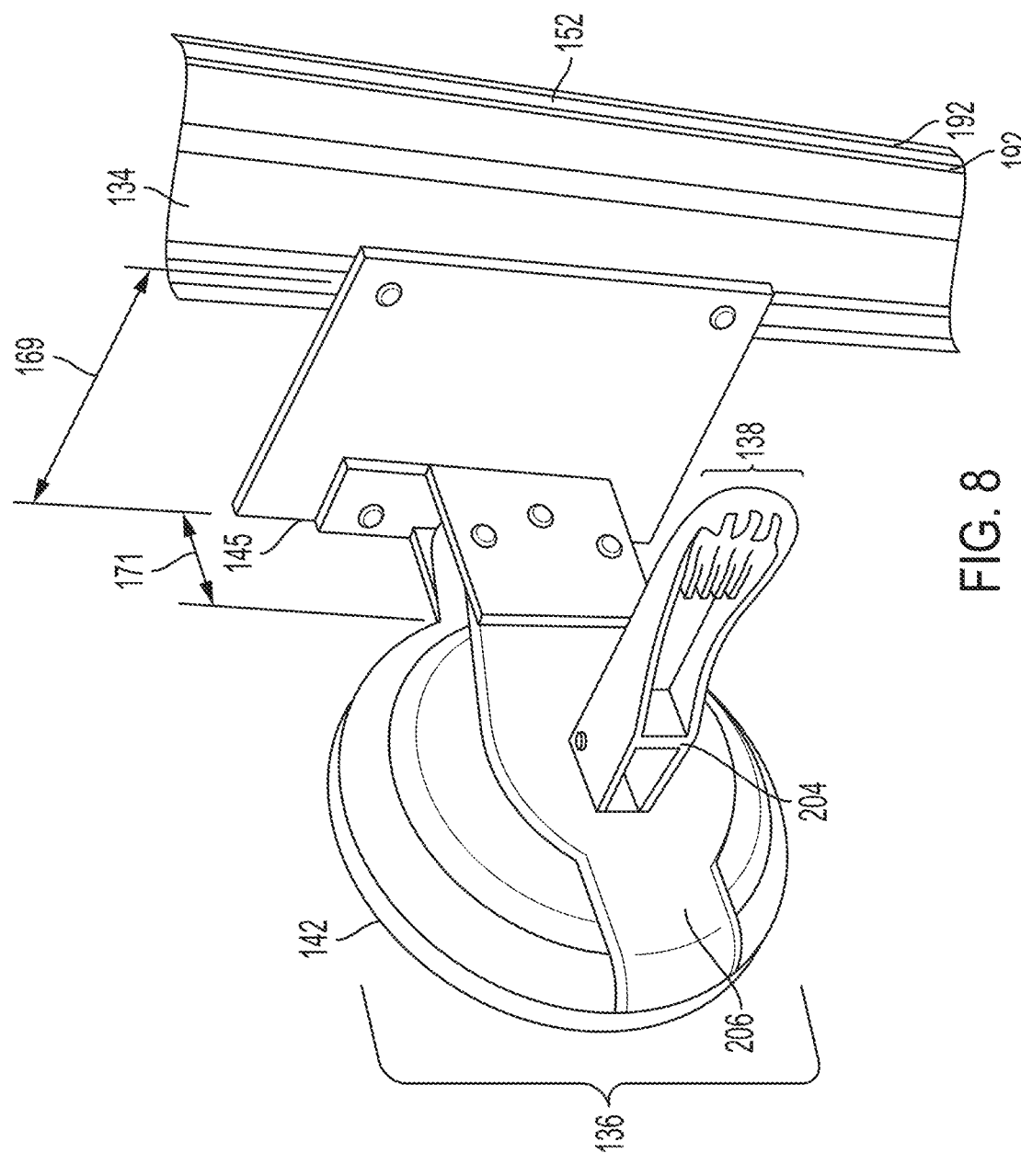
FIG. 8 is an enlarged, cut-away perspective view of a portion of the silicone edge graphic shown in FIG. 7.

Referring now to FIG. 8, the attachment member 145 may be positioned between the mounting surface 110 (see FIG. 7) and the front surface 192 of the frame slot 152 without directly touching the mounting surface 110 to mitigate or eliminate damage to the mounting surface 110 and the SEG sheet 170.

Figure 9:
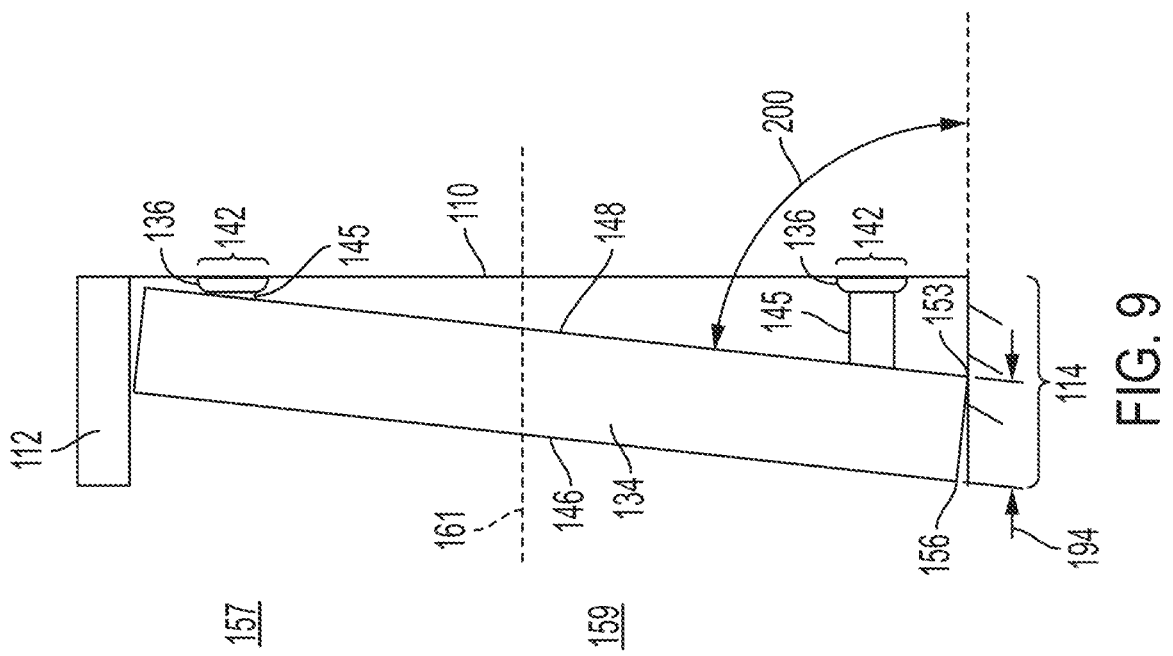
FIG. 9 is a side view of the silicone edge graphic shown in FIG. 7.
Figure 11:
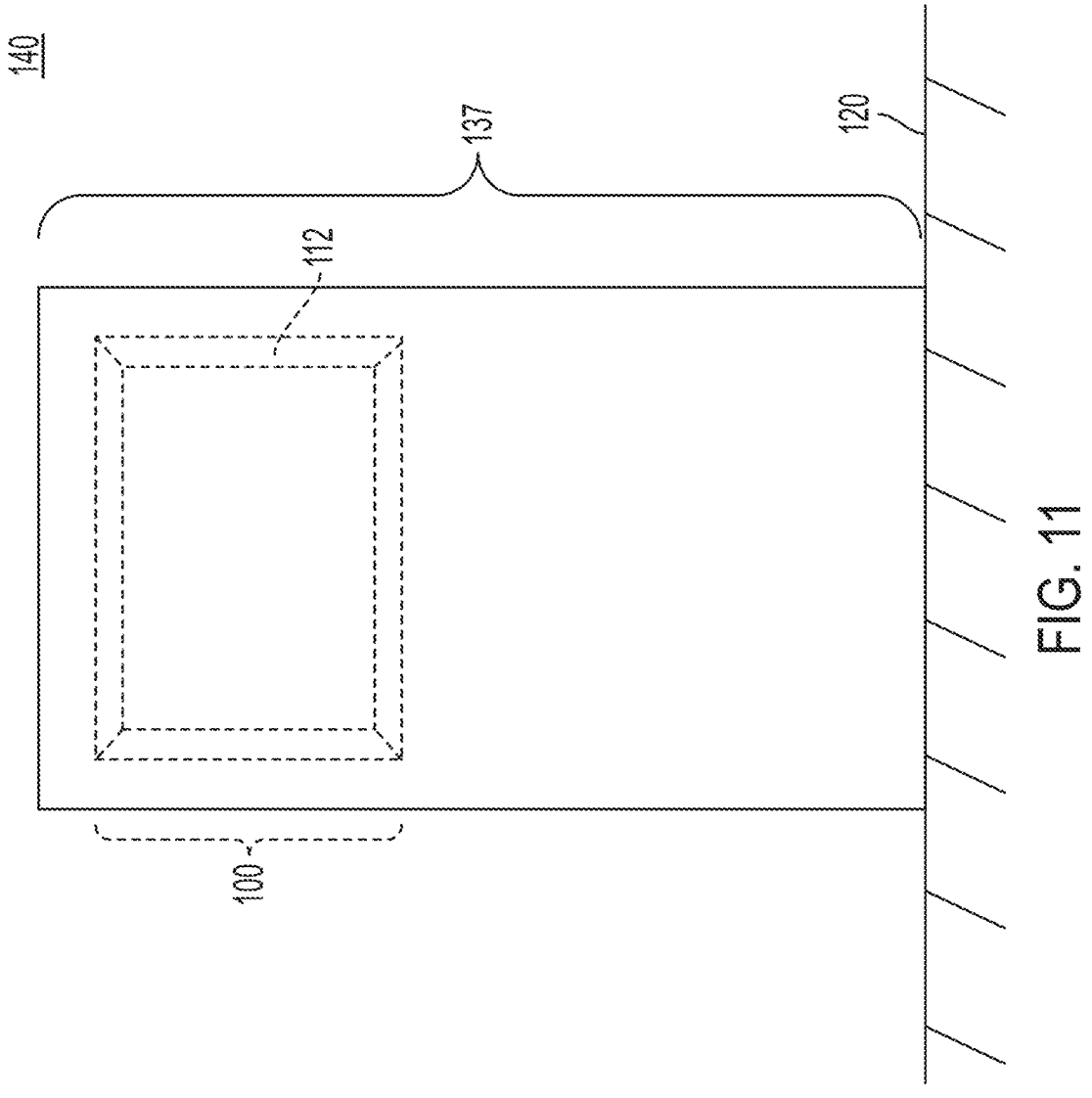
FIG. 11 is a front view of a silicone edge graphic resting on the ground mounted on and entirely covering a window.

Referring now to FIG. 9, the SEG frame 134 may be within the window frame 112 in a tilted position. When tilted as shown, the SEG leans against the window so that in the event the suction cups 136 fail, the SEG is still leaning against the window and this helps to prevent the SEG from falling forward. A bottom edge 156 of the front surface 146 of the silicone graphic frame 134 may also extend outside of the window frame 112 depending on the frame depth 194 or the tilt angle 200. The edge 153 of the SEG frame 134 may rest on a window sill 114 as shown to mitigate or eliminate vertical movement of the SEG 131 and rubbing of the suction cups 136 on the mounting surface 110. In other applications, the frame 134 may rest on the ground 120 (shown in FIGS. 11-13); for instance, if there is no window sill 114 or if the SEG frame 134 is larger than the window frame 112, as shown in FIG. 11. This embodiment will be discussed further below.

The suction cups 136 may each have an attachment member 145 extending from the frame 134 to the suction cups 136 mounted on the mounting surface 110. The suction cups 136 located on an upper half 157 of the frame 134 may each have a shorter attachment member 145 than the attachment members 145 of suction cups 136 located on a lower half 159 of the frame 134. In another example, at least one suction cup 136 located at a middle section 161 of the frame 134 may have a shorter attachment member 145 than the attachment member 145 of the at least one suction cup 136 located on the lower half 159 of the frame 134. As a result, the SEG frame 134 may tilt toward the mounting surface 110 where the upper half 157 of the frame 134 may be closer to the mounting surface 110 than the lower half 159 of the frame 134 without directly touching the mounting surface 110 to mitigate or eliminate damage to the mounting surface 110. The attachment members 145 may have nonadjustable dimensions as shown by example. The attachment members 145 may also have adjustable dimensions with attachable extensions or telescoping bodies. The adjustability of the attachment member dimensions 145 may control the position of the upper half 157 of the frame 134 and the lower half of the frame 134 in relation to the mounting surface 110, and thereby control the tilt angle 200.

Figure 10:
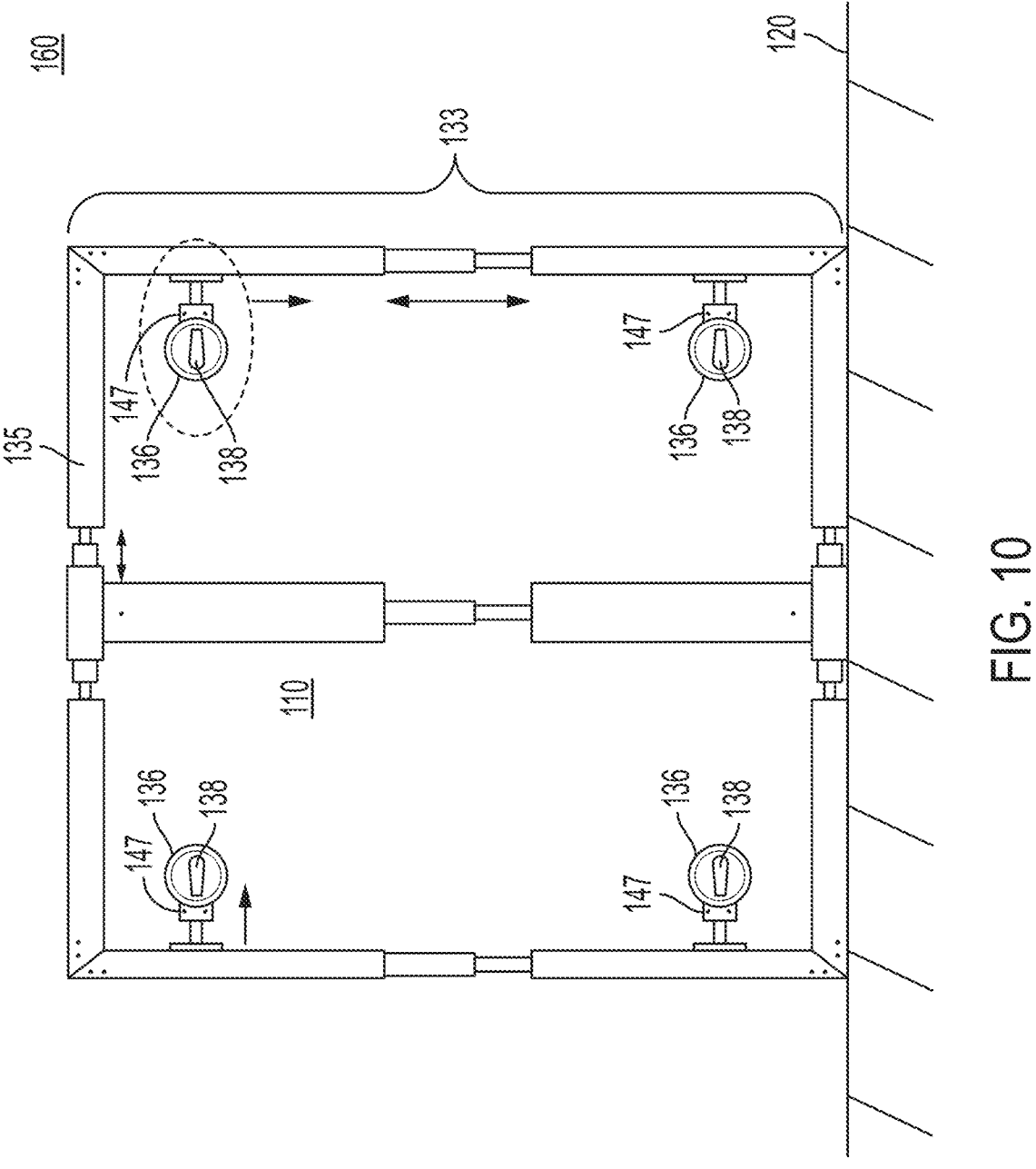
FIG. 10 is a front view of a telescoping frame and suction cups of a silicone edge graphic mounted on glass and resting on the ground.

Referring now to FIG. 10, another embodiment of the SEG 133 (see FIG. 2) is shown. The SEG 133 may have a telescopable frame 135 and a telescopable suction cup attachment member 147 to achieve a desired frame 134 dimension and engagement surface 142 (see FIG. 5) location, respectively. The frame 134 may telescope out laterally and/or longitudinally. The suction cup attachment member 147 may be slidable longitudinally along the SEG frame 135. The mounting surface 110 may be a large glass wall/ structure 160 as shown by example. The mounting surface 110 may be a window 100 (see FIG. 1) in other applications. The SEG 133 may sit on a support surface that may be the ground 120 as shown by example to mitigate or eliminate vertical movement of the SEG 133 and rubbing of the suction cups 136 on the mounting surface 110. In other applications, the SEG 133 may sit on a window sill 114 if the SEG frame 134 fits inside a window frame 112 (see FIG. 1).

Referring now to FIG. 11, another embodiment of the SEG 137 is shown. The SEG 137 may be mounted on a window 100 and rest on the ground 120 to mitigate or eliminate vertical movement of the SEG 137 and rubbing of the suction cups 136 (see FIGS. 12 and 13) on the mounting surface 110. The ground may provide additional support for the weight of the SEG 137. In this configuration, the SEG 137 may cover the entire window 100 so that people cannot see the window or the window frame 112. Alternatively, the SEG 137 may be mounted to a large glass structure or wall 160. In this example, from a front view, the wall 140 or glass structure/wall 160 and the SEG 137 may be the only visible elements.

Figure 12:
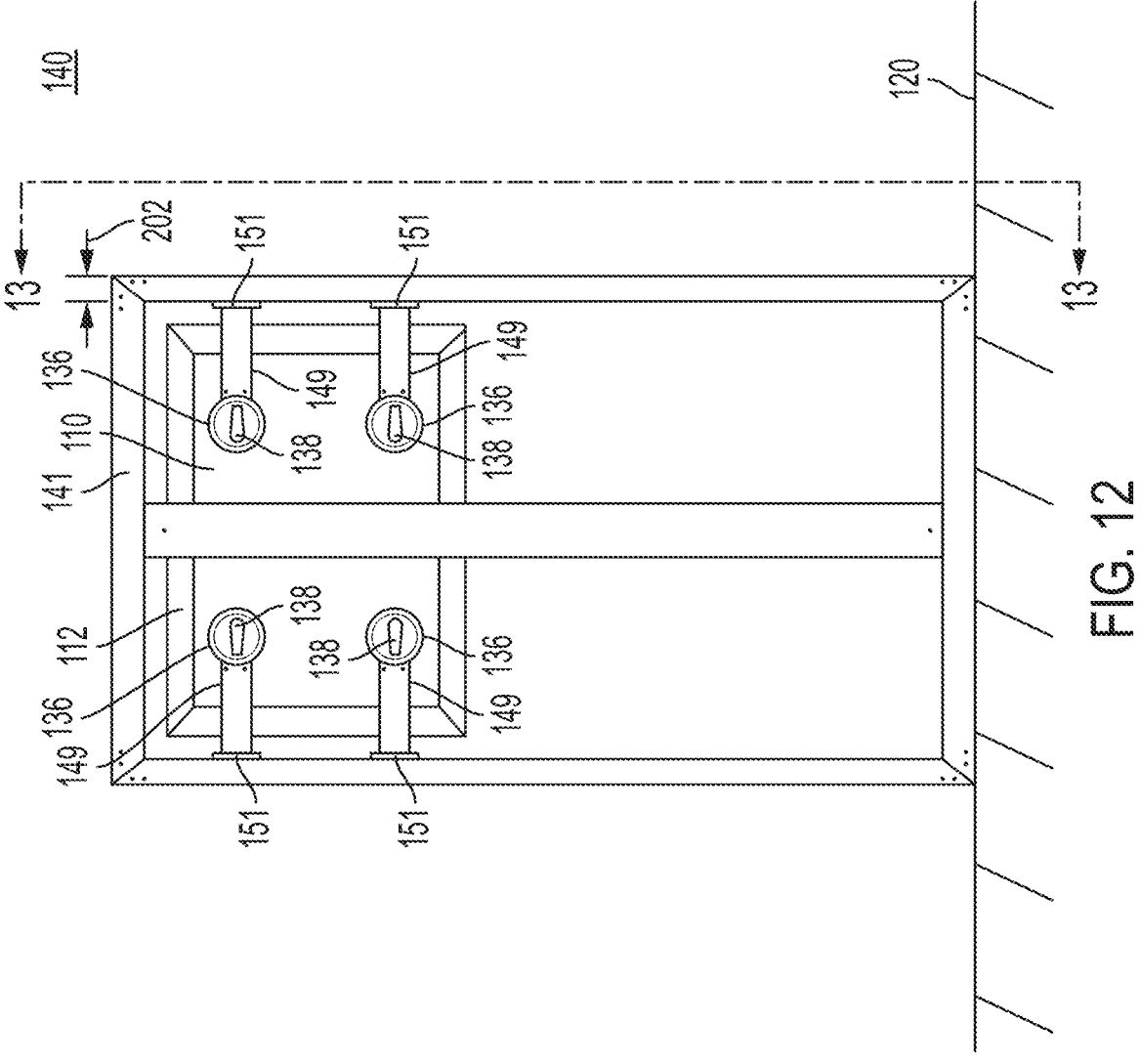
FIG. 12 is a front view of a frame and suction cups of the silicone edge graphic shown in FIG. 11.

Referring now to FIG. 12, a SEG frame 141 and a plurality of suction cups 136 of SEG 137 are shown by example. Each suction cup 136 may have a suction cup attachment member 149. The suction cup attachment member 149 may attach the suction cup 136 to the SEG frame 141. The suction cup attachment member 149 may be sufficiently dimensioned so that the engagement surface 142 (see FIG. 8) of the suction cup 136 can be mounted to the mounting surface 110 of the window. More particularly, length 171 (see FIG. 8) of the suction cup attachment member 149 may be sufficiently long so that the suction cups 136 are disposed in front of the glass of the window. Moreover, the length 169 (see FIG. 8) of the suction cup attachment member 149 may be sufficiently long so that the engagement surface 142 of the suction cups are in contact with the glass of the window while the frame 134 of the SEG 137 does not contact the window.

Figure 13:
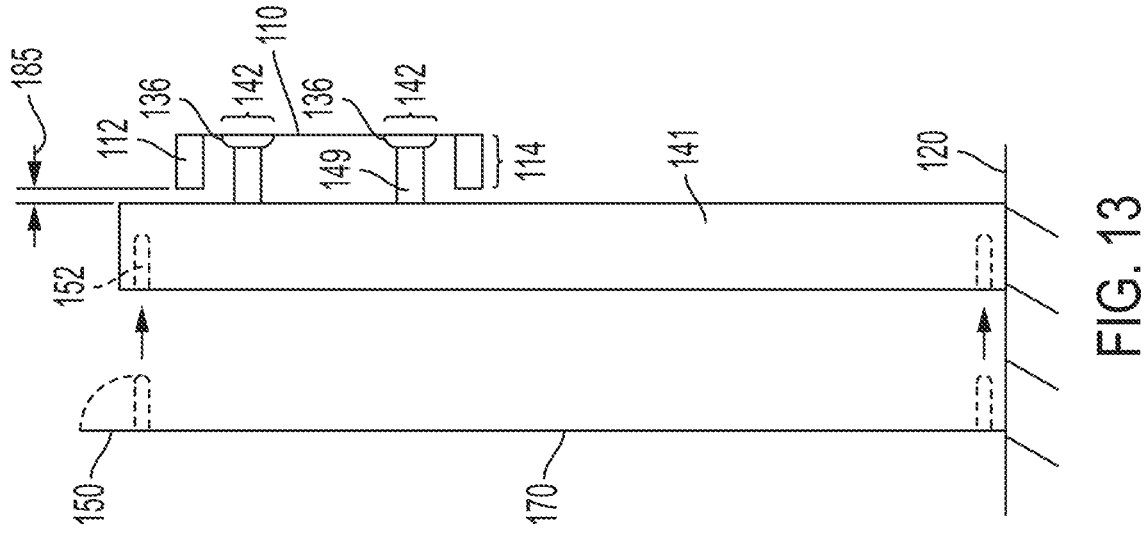
FIG. 13 is a side view of the frame and suction cups of the silicone edge graphic shown in FIG. 11 and a silicone edge graphic sheet insertable to the frame.

Referring now to FIG. 13, the suction cup attachment members 149 may be disposed in front of the window frame 112 so that the SEG frame 141 is not in direct contact with the window frame 112. This gap is represented by 185 in FIG. 13. The SEG frame 141 may be offset away from the exterior 111 of the structure or building (see FIG. 5) from the mounting surface 110 such that the SEG frame 141 is not in direct contact with the mounting surface 110 to mitigate or eliminate damage to the mounting surface 110. The SEG frame 141 may further be offset away from the exterior of the structure or building 111 from the window sill 114 such that the SEG frame 141 is not in direct contact with the window sill 114 to mitigate or eliminate rubbing damage to the window sill 114 and the SEG frame 141. The attachment members 149 may be sufficiently dimensioned from the attachment member bases 151 (see FIG. 12) to the suction cups 136 to provide clearance for the offsetting of the SEG frame 141 from both the window sill 141 and the mounting surface 110. To this end, the length 169 of the attachment member is lengthened to provide the clearance. The SEG sheet 170 may be attached to the SEG frame 134 by inserting the silicone edges 150 into the frame slot 152. The attachment members 144 may be positioned between the mounting surface 110 and the front surface 192 of the frame slot 152 without directly touching the mounting surface 110 or the mounted SEG sheet 170 to mitigate or eliminate damage to the mounting surface 110 and the SEG sheet 170. When the SEG sheet 170 is being displayed, the window 100 (see FIG. 11) may be covered entirely by the sheet 170 including the window frame 112.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A silicone edge graphic mountable to a mounting window for mitigating damage to a mounting surface, the silicone edge graphic comprising:

a frame defining front and rear sides;

a suction cup attached to the frame wherein the suction cup is completely disposed within a footprint of an outer periphery of the front side of the frame and behind the frame to hide the suction cup when a viewer views a printed indicia of the silicone edge graphic from a front perspective of the silicone edge graphic, the suction cup defining an engagement surface that generates a vacuum against the mounting surface to mount the silicone edge graphic to the mounting surface, the engagement surface of the suction cup being offset away from the rear side of the frame so that the front side of the frame is further away from the engagement surface than the rear side of the frame to prevent contact between the frame and the mounting surface when the silicone edge graphic is mounted to the mounting surface; and a sheet with the printed indicia thereon and disposed closer to the front side of the frame compared to the rear side of the frame, an outer peripheral portion of the sheet having a shape coinciding with an outer periphery of the frame, an edge portion of the sheet having silicone attached thereto, the silicone being disposed within slots formed in the frame to attach the sheet to the frame.

2. The silicone edge graphic of claim 1, wherein a bottom portion of the frame contacts a support surface to prevent vertical movement of the silicone edge graphic when mounted and prevent rubbing of the suction cup against the mounting surface.

3. The silicone edge graphic of claim 2, wherein the support surface is a sill of a window or a ground disposed in front of the window.

4. The silicone edge graphic of claim 2, further comprising a cushion attached to a bottom portion of the frame to prevent damage to the support surface.

5. The silicone edge graphic of claim 1, wherein the engagement surface is offset about ½ inch from the rear side.

6. The silicone edge graphic of claim 1, wherein the silicone edge graphic has a larger surface area than a surface area of the mounting surface and the silicone edge graphic is not in direct contact with the mounting surface or a wall of the mounting surface.

7. The silicone edge graphic of claim 1, wherein the silicone edge graphic has a smaller surface area than a surface area of the mounting surface and a bottom portion of the frame rests on a sill of the mounting surface.

8. A wall with a mounting surface and a silicone edge graphic attached to the mounting surface while mitigating damage to the mounting surface, the wall comprising:

a frame defining front and rear side;

a suction cup attached to the frame wherein the suction cup is completely disposed within a footprint of an outer periphery of the front side of the frame and behind the frame to hide the suction cup when a viewer views a printed indicia of the silicone edge graphic from a front perspective of the silicone edge graphic, the suction cup defining an engagement surface that generates a vacuum against the mounting surface to mount the silicone edge graphic to the mounting surface, the engagement surface of the suction cup being offset away from the rear side of the frame so that the front side of the frame is further away from the engagement surface than the rear side of the frame to prevent damage to the mounting surface when the silicone edge graphic is mounted to the mounting surface; and a sheet with the printed indicia thereon and disposed closer to the front side of the frame compared to the rear side of the frame, an outer peripheral portion of the sheet having a shape coinciding with an outer periphery of the frame, an edge portion of the sheet having silicone attached thereto, the silicone being disposed within slots formed in the frame to attach the sheet to the frame.

9. The wall of claim 8, wherein the frame has a larger surface area than a surface area of the mounting surface and the frame is not in direct contact with the mounting surface or a wall of the mounting surface.

10. The wall of claim 8, wherein the frame has a smaller surface area than a surface area of the mounting surface and a bottom portion of the frame rests on a sill of the mounting surface.

11. A method of mounting a silicone edge graphic to a mounting surface, the method comprising the steps of:

providing a frame having a fastener, the fastener being completely disposed within a footprint of the frame and behind the frame so that the fastener is hidden when a viewer views a front side of the frame from a front perspective of the silicone edge graphic, the frame being attachable to the mounting surface with the front side of the frame facing away from the mounting surface;

resting the frame on a support surface;

contacting the fastener directly with a mounting surface so that an engagement surface defined by the fastener generates a gripping force against the mounting surface and the engagement surface of the fastener is offset away from a rear side of the frame so that a front side of the frame is further away from the engagement surface than the rear side of the frame to prevent contact between the frame and the mounting surface;

providing a sheet with indicia printed thereon, an outer peripheral portion of the sheet having a shape coinciding with an outer periphery of the frame, an edge portion of the sheet having silicone attached thereto; and inserting a silicone edge portion of the sheet within a slot contouring outer edges of the frame.

12. The method of claim 11, wherein the support surface is a sill of the mounting surface or a ground disposed in front of the mounting surface.

13. The method of claim 11 further comprising the steps of:

providing the frame of the silicone edge graphic having an outer circumference smaller than an inner circumference of a frame of the mounting surface;

disposing the frame of the silicone edge graphic within the frame of the mounting surface.

14. The method of claim 11 further comprising the steps of:

providing the frame of the silicone edge graphic having an outer circumference larger than an inner circumference of a frame of the mounting surface;

disposing the frame of the silicone edge graphic in front of a wall of the mounting surface.

\* \* \* \* \*